United States Patent
Barrus et al.

(10) Patent No.: US 10,216,370 B2
(45) Date of Patent: Feb. 26, 2019

(54) TABS IN SYSTEM TASK SWITCHERS

(71) Applicant: Microsoft Technology Licensing, LLC, Redmond, WA (US)

(72) Inventors: Adam E. Barrus, Redmond, WA (US); Richard Fang, Bellevue, WA (US); Andrew M. Pickard, Redmond, WA (US); Samuel George Gates, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 247 days.

(21) Appl. No.: 15/158,261

(22) Filed: May 18, 2016

(65) Prior Publication Data
US 2017/0285894 A1    Oct. 5, 2017

Related U.S. Application Data

(60) Provisional application No. 62/314,907, filed on Mar. 29, 2016.

(51) Int. Cl.
*G06F 3/0482* (2013.01)
*G06F 3/0483* (2013.01)
(Continued)

(52) U.S. Cl.
CPC .......... *G06F 3/0483* (2013.01); *G06F 3/0482* (2013.01); *G06F 3/04842* (2013.01); *G06F 9/485* (2013.01)

(58) Field of Classification Search
CPC .. G06F 3/0483; G06F 3/0482; G06F 3/04842; G06F 9/485
See application file for complete search history.

(56) References Cited

U.S. PATENT DOCUMENTS 8,713,473 B2    4/2014   Shah et al.
8,819,585 B2    8/2014   Sareen et al.
(Continued)

OTHER PUBLICATIONS

"International Search Report and Written Opinion", Application No. PCT/US2017/023927, dated Jun. 26, 2017, 13 pages.
(Continued)

*Primary Examiner* — William L Bashore
*Assistant Examiner* — Gregory A Distefano
(74) *Attorney, Agent, or Firm* — Newport IP, LLC; Michael R. Cicero

(57) ABSTRACT

Techniques for exposing tabs in system task switchers are described herein. In one or more implementations, input is received to initiate a switch between different applications executed in a multi-application computing environment. In response, a system task switcher is launched to facilitate selection of and switching between the different applications. representations of the different applications are exposed via a user interface for the system task switcher. In the system task switcher configured to include functionality accessible via the system task switcher to exposed representations of individual tabs open in applications having tabbed user interfaces. Responsive to a selection of a particular application via the system task switcher, a switch occurs to the particular application in the multi-application computing environment. If a particular tab is selected, the switch occurs to expose the application UI with the selected tab being presented as the active/top tab with focus in the application UI.

17 Claims, 9 Drawing Sheets

(51) Int. Cl.
*G06F 3/0484* (2013.01)
*G06F 9/48* (2006.01)

(56) References Cited

U.S. PATENT DOCUMENTS

| | | | |
|---|---|---|---|
| 8,856,675 B1* | 10/2014 | Agarawala | G06F 3/0482 715/777 |
| 8,881,032 B1* | 11/2014 | Weber | G06F 3/0483 715/733 |
| 8,930,840 B1 | 1/2015 | Risko et al. | |
| 9,747,006 B2* | 8/2017 | Fisher | G06F 17/30528 |
| 2003/0117440 A1* | 6/2003 | Hellyar | G06F 3/0235 715/767 |
| 2006/0230356 A1 | 10/2006 | Sauve et al. | |
| 2008/0109753 A1 | 5/2008 | Karstens | |
| 2010/0146449 A1 | 6/2010 | Brown et al. | |
| 2012/0174020 A1 | 7/2012 | Bell et al. | |
| 2012/0210266 A1 | 8/2012 | Jiang et al. | |
| 2013/0061160 A1 | 3/2013 | Tseng | |
| 2013/0091451 A1 | 4/2013 | Holecek et al. | |
| 2013/0152010 A1 | 6/2013 | Weber et al. | |
| 2013/0174179 A1 | 7/2013 | Park et al. | |
| 2014/0365854 A1 | 12/2014 | Karunamuni et al. | |
| 2015/0052473 A1* | 2/2015 | Kuscher | G06F 3/0481 715/777 |

OTHER PUBLICATIONS

"Windows 10 Tutorial | How to Use Virtual Desktops and Task View", Published on: Aug. 31, 2015, Available at: https://www.youtube.com/watch?v=BatWbZ_s8P4.

Spencer, Alex, "How to Toggle Within and Between Apps in OS X", Published on: Nov. 12, 2013, Available at: http://computers.tutsplus.com/tutorials/how-to-toggle-within-and-between-apps-in-os-x--mac-56503.

Thurrott, Paul, "Windows 10 Tip: Switch Between Open Apps and Desktops", Published on: Oct. 5, 2014, Available at: http://winsupersite.com/windows-10/windows-10-tip-switch-between-open-apps-and-desktops.

* cited by examiner

TABS IN SYSTEM TASK SWITCHERS

PRIORITY

This application claims priority to U.S. Provisional Patent Application No. 62/314,907, filed Mar. 29, 2016, and titled "Tabs in System Task Switchers," the disclosure of which is incorporated by reference in its entirety.

BACKGROUND

Conventional operating systems permit users to view multiple computing applications through windows. Each of these windows generally includes a frame or control for selecting which window is primary or to move, size, or otherwise manage placement of the window with respect to a workspace and other windows. These frames or controls, however, often only enable interaction with a currently active window and can result in unintended occlusion and overlap between the windows. Moreover, underlying applications associated with windows generally must be launched and running before content may be manipulated via the applications. In the case of applications with tabbed user interfaces, generally only the top tab is shown and thus it is difficult for user to switch to a particular one of multiple tabs that may be open in the UI. Accordingly, interaction with multiple windows to handle content items may require a user to perform a series of tasks to activate, launch, position, and/or size each window as desired and then to select particular underlying tabs if desired. As such, managing the layout of multiple windows in this fashion and switching between apps and tabs can be overly complicated, time-consuming, and frustrating to users.

SUMMARY

Techniques and apparatuses for exposing tabs in system task switchers in a multi-application environment are described herein. The multi-application environment described herein presents one or more application windows, which can be sized, positioned, or layered to provide interaction with functionality provided by corresponding applications. In one or more implementations, input is received to initiate a switch between different applications executed in the multi-application computing environment. In response, a system task switcher is launched to facilitate selection of and switching between the different applications. Representations of the different applications are exposed via a user interface for the system task switcher. In the system task switcher configured to include functionality accessible via the system task switcher to exposed representations of individual tabs open in applications having tabbed user interfaces. Responsive to a selection of a particular application via the system task switcher, a switch occurs to the particular application in the multi-application computing environment. The switching involves positioning the application window to a top-level position in the UI and/or changing the focus to the application. If a particular tab is selected, the switch occurs to expose the application UI with the selected tab being presented as the active/top tab with focus in the application UI.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the following discussion.

DETAILED DESCRIPTION

Overview

Figure 1:
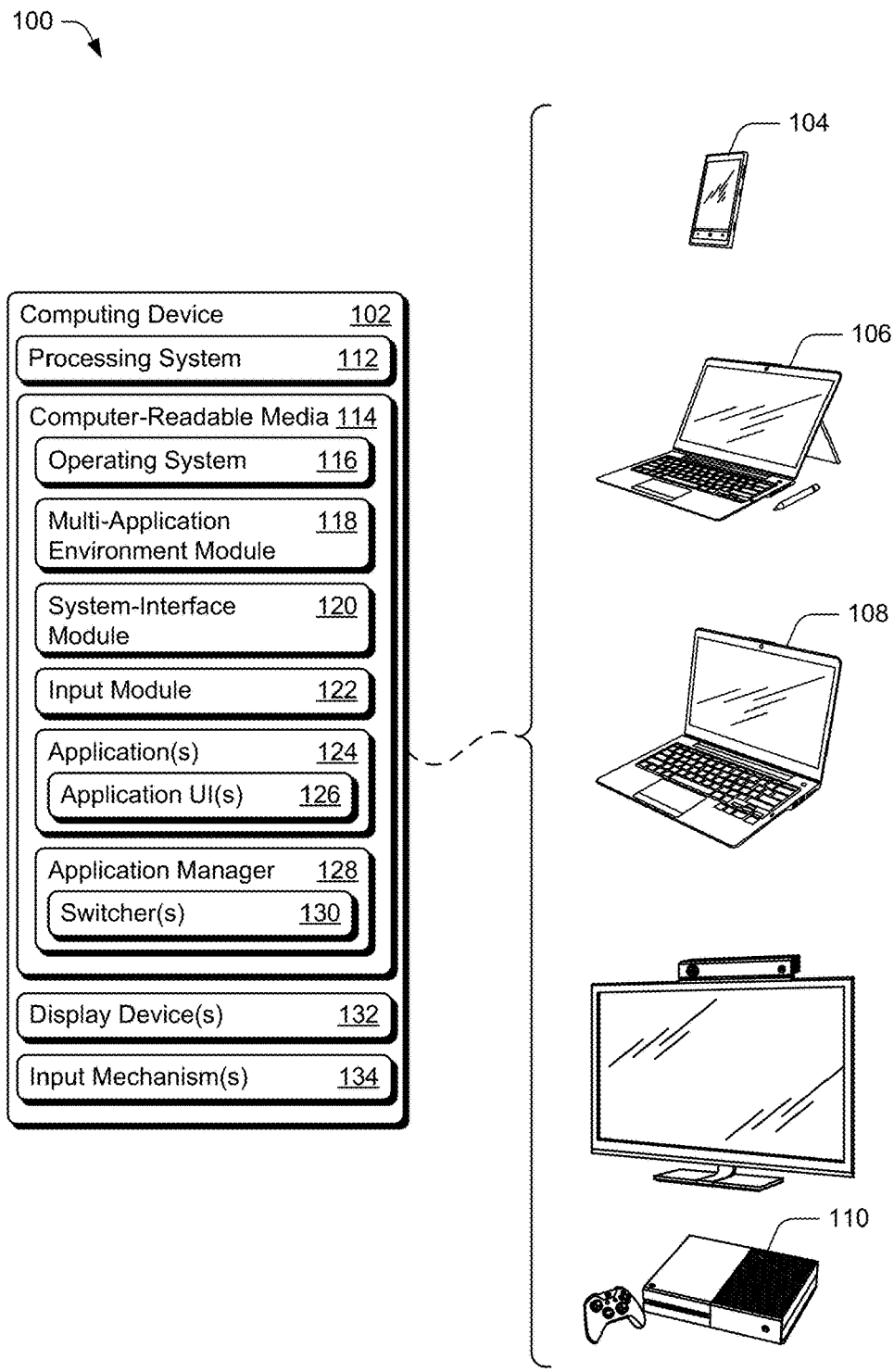
FIG. 1 is an illustration of an example operating environment that is operable to employ techniques described herein.

In the case of applications with tabbed user interfaces, generally only the top tab is shown and thus it is difficult for user to switch to a particular one of multiple tabs that may be open in the UI via a switcher. Accordingly, interaction with multiple windows to handle content items may require a user to perform a series of tasks to activate, launch, position, and/or size each window as desired and then to select particular underlying tabs if desired. As such, managing the layout of multiple windows in this fashion and switching between apps and tabs can be overly complicated, time-consuming, and frustrating to users.

Techniques and apparatuses for exposing tabs in system task switchers in a multi-application environment are described herein. The multi-application environment described herein presents one or more application windows, which can be sized, positioned, or layered to provide interaction with functionality provided by corresponding applications. In one or more implementations, input is received to initiate a switch between different applications executed in the multi-application computing environment. In response, a system task switcher is launched to facilitate selection of and switching between the different applications. Representations of the different applications are exposed via a user interface for the system task switcher. In the system task switcher configured to include functionality accessible via the system task switcher to exposed representations of individual tabs open in applications having tabbed user interfaces. Responsive to a selection of a particular application via the system task switcher, a switch occurs to the particular application in the multi-application computing environment. The switching involves positioning the application window to a top-level position in the UI and/or changing the focus to the application. If a particular tab is selected, the switch occurs to expose the application UI with the selected tab being presented as the active/top tab with focus in the application UI.

In implementations, tabs are shown along with representations for different applications within the switcher UI. For example, a thumbnail for each available app and tab may be shown in a grid, in a row, or in a column. The switcher UI may enable scrolling to representations for items that may be initially positioned logically outside of the viewing pane in which the representations are displayed. This approach may be particular useful in the context of mobile devices that have limited screen real estate. Items may also be visualized as a stack of items with tabs included. A user can cycle through the stack to select different items. In the noted approaches, representations for applications and tabs are treated as equal peer objects that are shown and handled in the same manner.

In another approach, the switcher UI may be configured to expose apps and tabs via different panes or modalities. For example, the switcher UI may be configured to initially expose just applications at an "application" level via a pane, pop-up element, or other UI component. Then, designated user interaction with a representation of an applications having tabs (e.g., a browser) may be used to trigger display of underlying tabs for selection via the UI. This additional "tab" level of the switcher can be implement in various ways. For example, tab representations may be exposed via a slide-out, pop-up element, window or other element that appears responsive to interaction such as hover, clicking, or otherwise selecting the corresponding item at the application level. In another approach, the switcher UI switches from showing the application level items to showing the tab level items responsive to the interaction.

In a particular example, websites open in a browser can be exposed into the system's various task switchers as native objects, which are peers of top-level windows. The system task switcher is designed to identify and display each top-level window when the switcher is invoked. Using the techniques described herein, each of the tabs open in the user's browser windows (or perhaps a subset of tabs, chosen by some smart criteria such as most recent, favorites, etc.) appear in that same task switcher view to allow quick and easy switching between app windows and websites shown on individual tabs. It is noted that the techniques may be extended to any type of task switcher or task view as well as to various types of tabbed applications, including but not limited to tabbed browsers. The techniques may also be extended to mobile devices, by showing all open web sites (or some smart subset of open web sites) in the task switcher for the mobile device.

In the following discussion, an example environment is first described that may employ the techniques described herein. Example details and procedures are then described which may be implemented in the example environment as well as other environments. Consequently, the example details and procedures are not limited to the example environment and the example environment is not limited to the example details and procedures. Lastly, an example system and components of the system are discussed that may be employed to implement aspects of the techniques described herein.

Example Environment

FIG. 1 is an illustration of an environment 100 in an example implementation that is operable to employ techniques described herein. The illustrated environment 100 includes a computing device 102 that may be configured in a variety of ways. For example, a computing device may be configured as a smart phone computer 104, a tablet computing device 106, a laptop computer 108, and a gaming device 110 as illustrated in FIG. 1. Other computing devices and systems are also contemplated, such as set-top boxes, servers, and netbooks, and so forth. The computing device may range from full resource devices with substantial memory and processor resources (e.g., personal computers, game consoles, tablets) to a low-resource device with limited memory and/or processing resources (e.g., traditional set-top boxes, hand-held game consoles, mobile phones). Additionally, although a single computing device is shown in some instances, the computing device may be representative of a plurality of different devices. Further examples of computing systems and devices suitable to implement techniques described herein are described below in relation to FIG. 14.

In the illustrated example, the computing device 102 includes a processing system 112 having one or more processing devices and computer-readable media 114 configured to implement various application programs, modules, logic, and/or device functionality. For instance, the computer-readable media 114 may include an operating system 116, multi-application environment module 118, system-interface module 120, input module 122, application(s) 124, each having one or more application user interfaces 126 (application UI(s) 126), and an application manager 128, which includes or has access to an application queue 130.

The computing device 102 additionally may include or otherwise make use of one or more display devices 132 and input mechanisms 134. Display devices 132 may be separate or integrated with the computing device 102. Input mechanisms 134 may include gesture-sensitive sensors and devices, such as touch-based sensors and movement-tracking sensors (e.g., camera-based), as well as mice (free-standing or integral with a keyboard), a stylus, touch pads, accelerometers, and microphones with accompanying voice recognition software, to name a few. Input mechanisms 134 may be separate or integrated with displays device 132. Integrated examples may include gesture-sensitive displays with integrated touch-sensitive or motion-sensitive sensors.

The operating system 116 manages resources of the computing device 102 and may be implemented using any suitable instruction format, such as 64-bit, 32-bit, reduced instruction set computing (RISC), complex instruction set computing (CISC), and the like. The operating system is configured to abstract underlying functionality of the underlying device to applications that are executable on the computing device. For example, the operating system 116 may abstract processing, memory, network, and/or display functionality such that the applications 124 may be written without knowing "how" this underlying functionality is implemented. The applications, for instance, may provide data to the operating system to be rendered and displayed by a display device without understanding how this rendering will be performed. A variety of applications typically associated with client devices are contemplated including, but not limited to, a productivity suite that integrates multiple office productivity modules, a web browser, games, a multimedia player, a word processor, a spreadsheet program, a photo manager, and so forth.

The multi-application environment module 118 provides a multi-application environment by which a user may view and interact with one or more of applications 124 through application UIs 126, which are presented via respective application windows. The multi-application environment module 118 may be provided via the operating system 116 in various ways. In some cases, the multi-application environment is an overlapping windowing environment or workspace (e.g., "desktop") that enables management or manipulation of a position, size, and/or front-to-back ordering (collectively, "placement") of overlapping windows (e.g., the z-ordering of the windows) or non-overlapping windows. Multi-application environment module 118 may present application UIs 126 through application windows having frames. These frames may provide controls through which to interact with an application and/or controls enabling a user to position and size the window. Alternately or additionally, multi-application environment module 118 may present application UIs 126 through application windows having little or no window frame, and/or without presenting visual controls (e.g., permanent controls on a window frame or in a window obscuring content). At least some applications 124 may employ application UIs 126 configured as tabbed UIs that enable access to different pages, documents, sites and the like using multiple different tabs. One familiar example is a browser that enables access to different resources (e.g., webpages, documents, websites, services, web content, etc.) using different tabs of the browser.

The multi-application environment enabled by multi-application environment module 118 can be, but is not required to be, hosted and/or surfaced without use of a windows-based desktop environment. Thus, in some cases multi-application environment module 118 presents a multi-application environment as an immersive environment and precludes usage of desktop-like displays (e.g., a taskbar). Further still, in some embodiments this multi-application environment is similar to an operating system in that it is not closeable or capable of being un-installed. While not required, in some cases this multi-application environment enables use of all or nearly all of the pixels of a display by applications within the multi-application environment.

System-interface module 120 provides one or more interfaces through which interaction with operating system 116 is enabled, such as an application-launching interface or "application picker", a task bar, a start menu, a control panel, or a system tools or options menu, to name just a few. Input module 122 receives input through the application windows, input mechanisms 134, or other controls and affordances of a multi-application environment.

Each application 124 includes one or more application UIs 126, which enables viewing or interaction with content of the application. Application UIs 126 may include pre-defined properties or preferences (e.g., default values or settings) for presenting an application 124, such as an aspect ratio, maximum size, minimum size, position, priority, display orientation, and the like. Application manager 128 enables management of applications 124, such as launching and terminating applications, switching between application windows, selecting states for applications as active or suspended, and tracking active applications. In some cases, the application manager 128 enables relationships between applications to be established and maintained, such as applications that are frequently launched, positioned, or used within close proximity to each other. Application manager 128 may also have access to, or maintain, one or more switchers 130. Switchers 130 represent functionality to facilitate selection of and switching between the different applications as discussed above and below. In accordance with techniques described herein, the switchers 130 may be configured to provide visualizations to enable switching between applications including representations of both applications and underlying tabs for tabbed UIs. Further details and examples of switching techniques that involves representations for tabs of tabbed UIs are discussed in relation to the following figures Any or all of operating system 116, multi-application environment module 118, system-interface module 120, input module 122, application(s) 124, application manager 128 and switchers 130 may be implemented as separate components or combined or integrated together in different combinations in any suitable form.

Having considered the foregoing example environment, consider now a discussion of some example details and procedures in accordance with one or more implementations.

Implementation Details

This section discusses details of techniques and example procedures that may be used for tabs in system task switchers in accordance with one or more implementations. As noted, a multi-application environment may be provided that enables multi-tasking with multiple applications and application windows at the same time. The operating system 116 through the application manager 128, switchers 130, and/or other components configured to manage allocation of resources for execution of the multiple applications, an application queue, and presentation of applications via the UI.

Figure 2:
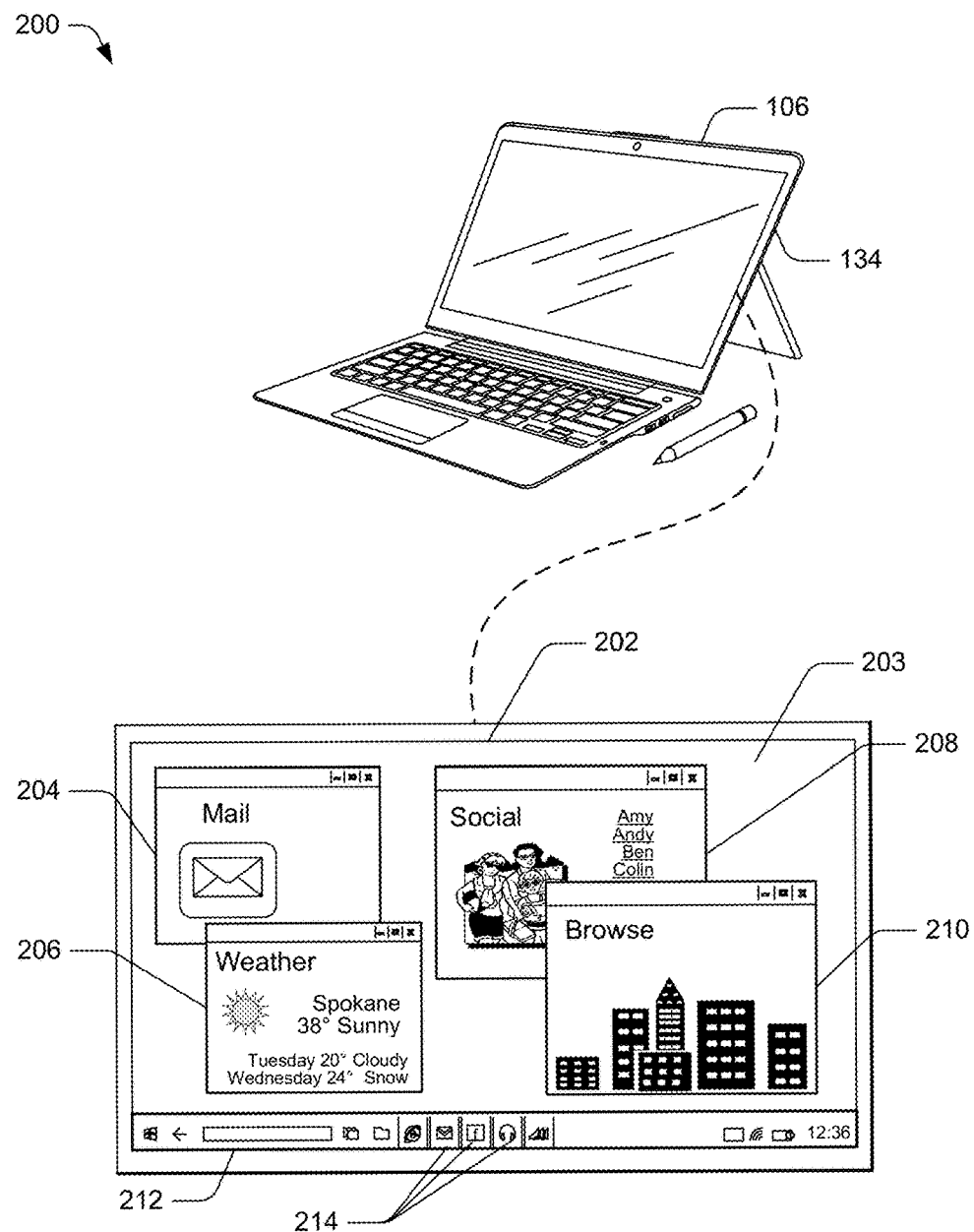
FIG. 2 illustrates an example computing device having a user interface for a multi-application environment in accordance with one or more implementations.

FIG. 2 illustrates generally at 200 an example computing device 102 having a user interface 202 for a multi-application environment 203 in accordance with one or more implementations. In this particular example, the computing device 102 in the form of a tablet is depicted as rendering the user interface 202 via a display device 134. In at least some embodiments, multi-application environment 202, or a section thereof, fully occupies a screen or visible area of a display. As such, edges of multi-application environment 202 may align with respective edges of the screen or visible area of the display.

Here, the multi-application environment 203, which may also be referred to as a workspace or desktop, includes multiple representative examples of application windows for different application. The illustrated application windows include windows corresponding to mail 204, weather 206, social 208, and browser 210 applications. The applications and corresponding windows may expose content items and provide different kinds of functionality for interaction with the content items. Content items may include, but are not limited to, data files, images, audio, structured data, objects, video files, textual items, and so forth.

Additionally, the multi-application environment 203 may include a control area that may provide application picker functionality, such as a menu system, tool bar, application launch window, application tile view, and so forth. The control area in the example of FIG. 2 is configured as a task bar 212. The task bar 212 enables access to features and functions of the operating system 116, system-interface module 120, or other applications 124 of computing device 102. For example, application windows can be launched or switched from task bar 212 using visual representations 214 of the application, which may be in the form of tiles, application icons, labels, buttons, menu items, thumbnail images, or other suitable application launch elements configured to facilitate interaction with application windows. The user interface 202 and task bar 212 may also provide controls operable to launch switchers 130 to facilitate switching between application windows.

Generally, switching involves positioning a selected window at the top of the window stack, and/or giving focus to the selected application. In operation, input is received to initiate a switch between different applications executed in a multi-application computing environment by launching one of the switchers 130. In response, the selected system task switcher is launched to facilitate selection of and switching between the different applications. Representations of the different applications are exposed via a user interface for the system task switcher. In accordance with techniques described herein, the system task switcher is configured to include functionality accessible to expose representations of individual tabs open in applications having tabbed user interfaces. Responsive to a selection of a particular application via the system task switcher, a switch occurs to the particular application in the multi-application computing environment. Here, the switching involves positioning the application window to a top-level position in the UI and/or changing the focus to the application. If a particular tab is selected, the switch occurs to expose the application UI with the selected tab being presented as the active/top tab with focus in the application UI. Additional details are discussed in relation to the following example scenarios and procedures.

Example Scenarios

Figure 3:
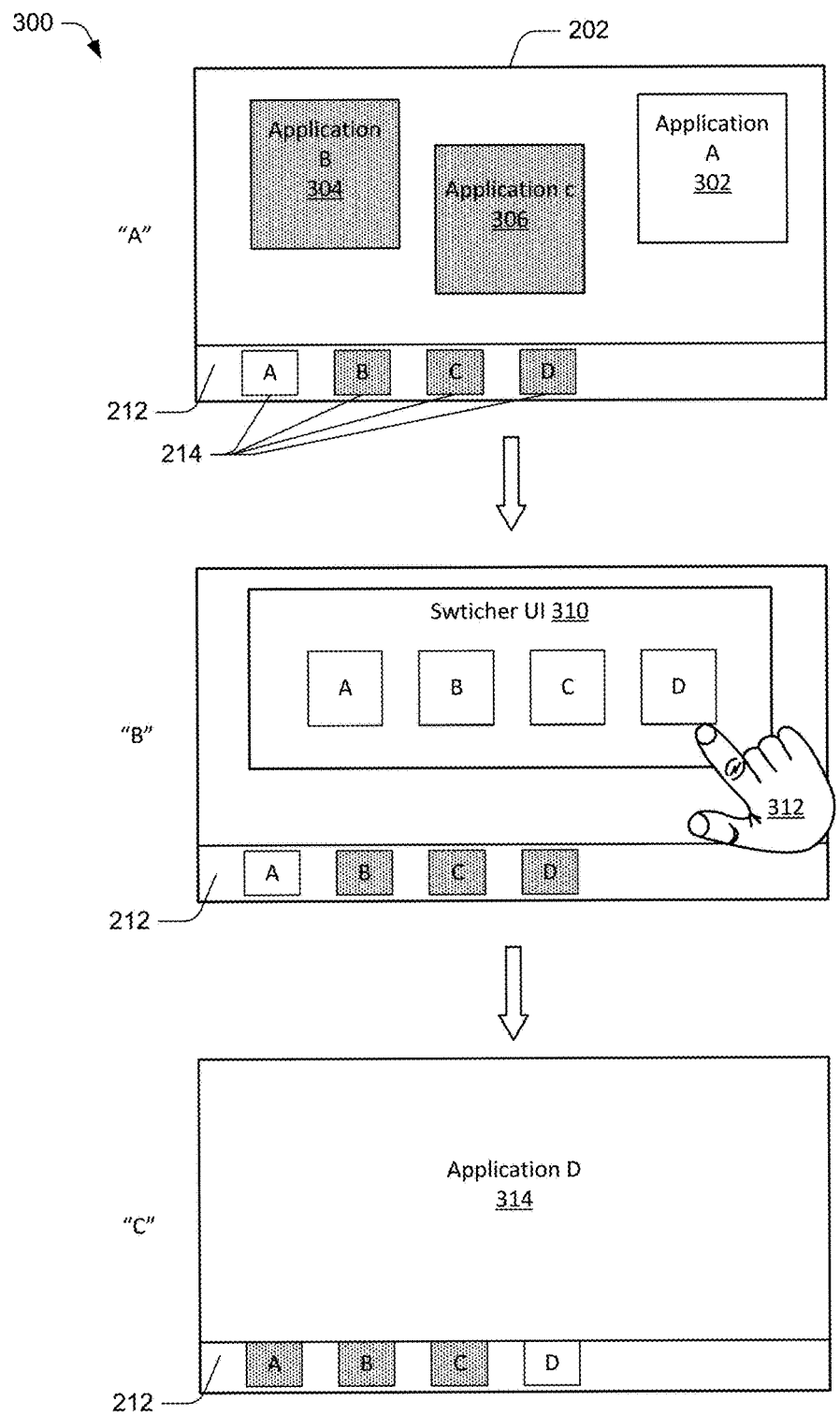
FIG. 3 illustrates an example scenario for switching via a system task switcher in a multi-application environment in accordance with one or more implementations.

FIG. 3 illustrates generally at 300 an example scenario for switching via a system task switcher in a multi-application environment in accordance with one or more implementations. In this example, a series of views of a user interface 202 for the multi-application environment represented by different letters "A" to "C" are depicted, which illustrate operations switch between applications. For example, FIG. 3 depicts in view "A" the multi-application environment 202 as exposing windows associated with application A 302, application B 304, and application C. Application A 302 represents a running application in an active state that has the focus. In other words, Application A 302 is the currently selected application. Application B and application C 304 represent applications in the background that may be in a background, suspended, or closed state.

View "A" also represents a task bar 212 which may include visual representations 214 corresponding to applications as noted previously. The visual representations 214 may be selectable to launch and/or switch between corresponding applications. Note that the example visual representations and example windows exposed in view "A" reflect that application A is launched and active, application B and application C are available via a window in the user interface 202 but are in the background, and application D is represented as closed and/or suspended in the background (e.g., minimized) such that an application window for application C does not appear in the interface.

View "B" represents interaction which generates input to launch a switcher UI 310 corresponding to a switcher 130. The switcher UI 310 includes representations for each of the available applications. The representations may be selectable to switch to a corresponding application. It is noted that one or more of the applications may include tabs in which case the tabs may be also represented via the switcher UI 310 either as additional items on the same level as the app representations, or as items shown on a different level or window responsive to designated interaction with items in the switcher UI 310. Detailed example of scenarios involving tabs are discussed below.

Input 312 in various forms (e.g., touch as illustrated, a key command, mouse input, etc.) to select one of the representations is also shown in view. Input is shown as touch-based input however various input modalities are contemplated including touch, stylus input, key commands (e.g., control+tab), mouse input, voice and so forth.

Switching to the selected application occurs in response to the input 312 as represented in view "C". Here, the application window for Application D 314 is launched and maximized and other windows of moved back in the window stack. Although the Application D 314 is maximized in this example, the switching may alternatively involve rearranging the positions of multiple visible windows within the stack and the UI.

Figure 4:
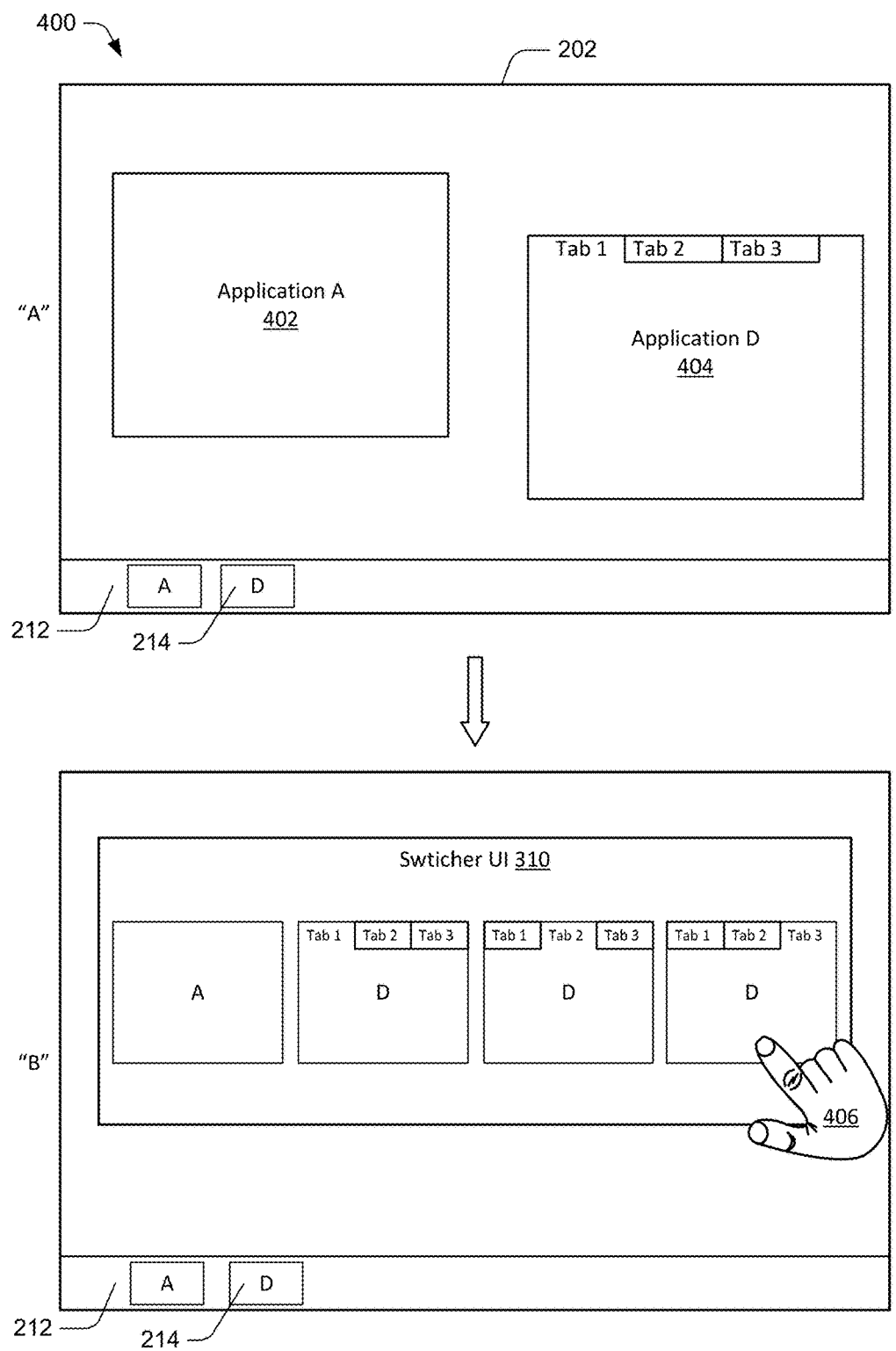
FIG. 4 illustrates another example scenario for switching via a system task switcher in a multi-application environment in accordance with one or more implementations.

FIG. 4 illustrates generally at 400 another example scenario for switching via a system task switcher in a multi-application environment in accordance with one or more implementations. In particular, FIG. 4 depicts an example in which the switcher UI 310 exposes representation of tabs along with applications. In view "A", application windows for Application A 402 and Application D 404 are depicted. In this example, Application D 404 has a tabbed interface with three available tabs (tab 1, tab 2, and tab 3). Consequently, when the switcher UI 310 is launched as shown in view "B", the representations shown via the switcher UI 310 include representations for each of the individual tabs. Here, the tabs are shown in-line with the apps (e.g., UI for app A). As discussed above and below, different approaches to expose the tabs are also contemplated such as via a separate window element, slide-out or pop-up elements that respond to hover input, clicks etc., a toggle to replace app views with tab views and so forth. In this case, input 406 in various forms (e.g., touch as illustrated, a key command, mouse input, etc.) to select one of the representations cause switching to the selected item. Here, since the input 406 is applied to the representation for tab 3, the switcher is able to switch directly to the UI for Application D with tab 3 exposed as the top tab.

Figure 5:
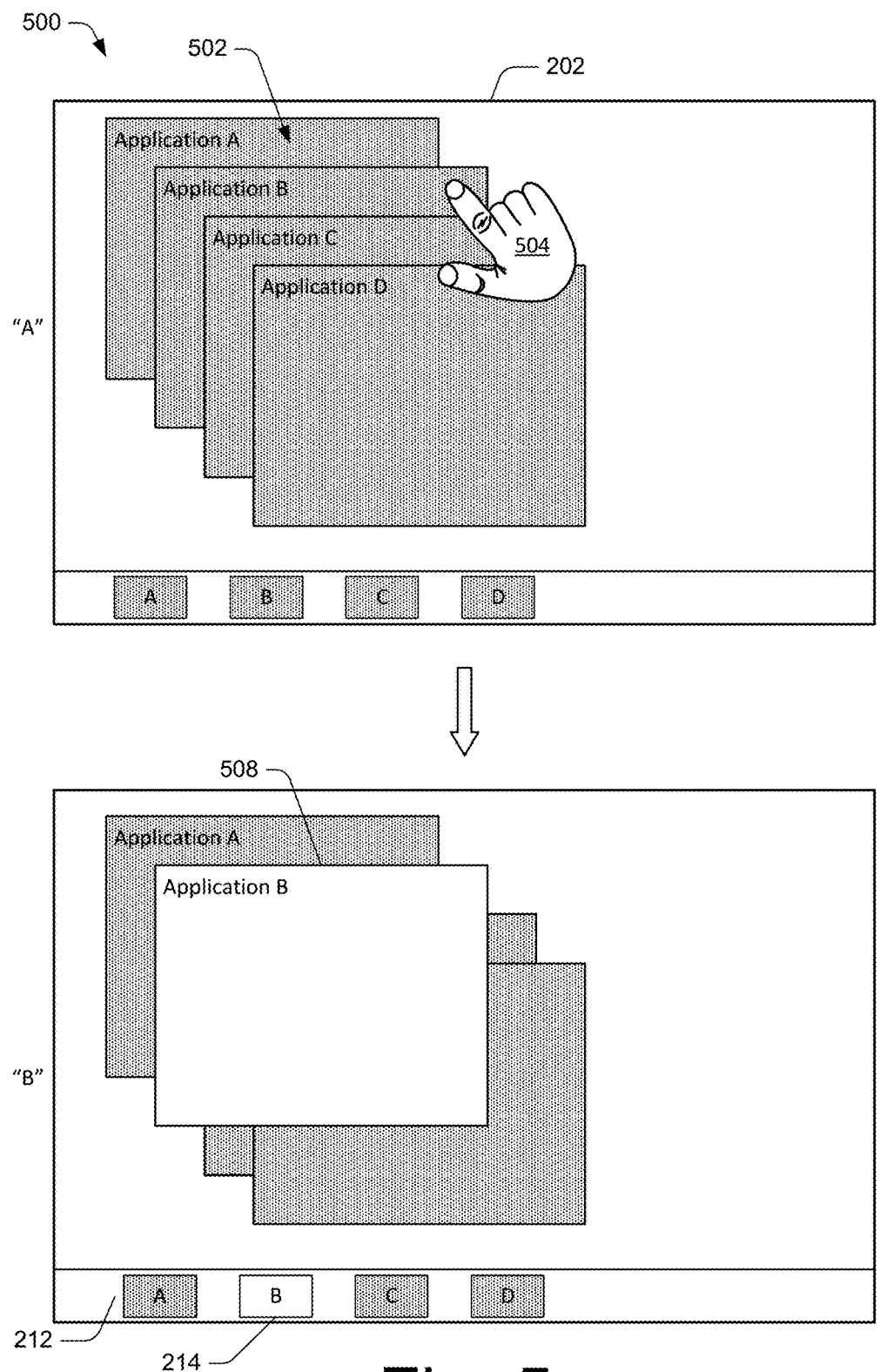
FIG. 5 illustrates a further example scenario for switching via a system task switcher in accordance with one or more implementations.

FIG. 5 illustrates generally at 500 a further example scenario for switching via a system task switcher in accordance with one or more implementations. This example represents a scenario in which the switcher 130 enable switching by arranging items (including applications and tabs) and enables a user to cycle through the stack to select a particular item and switch to that items. Input 504 in various forms (e.g., touch as illustrated, a key command, mouse input, etc.) to select one of the representations again causes switching to the selected item as represented in view "B".

Figure 6:
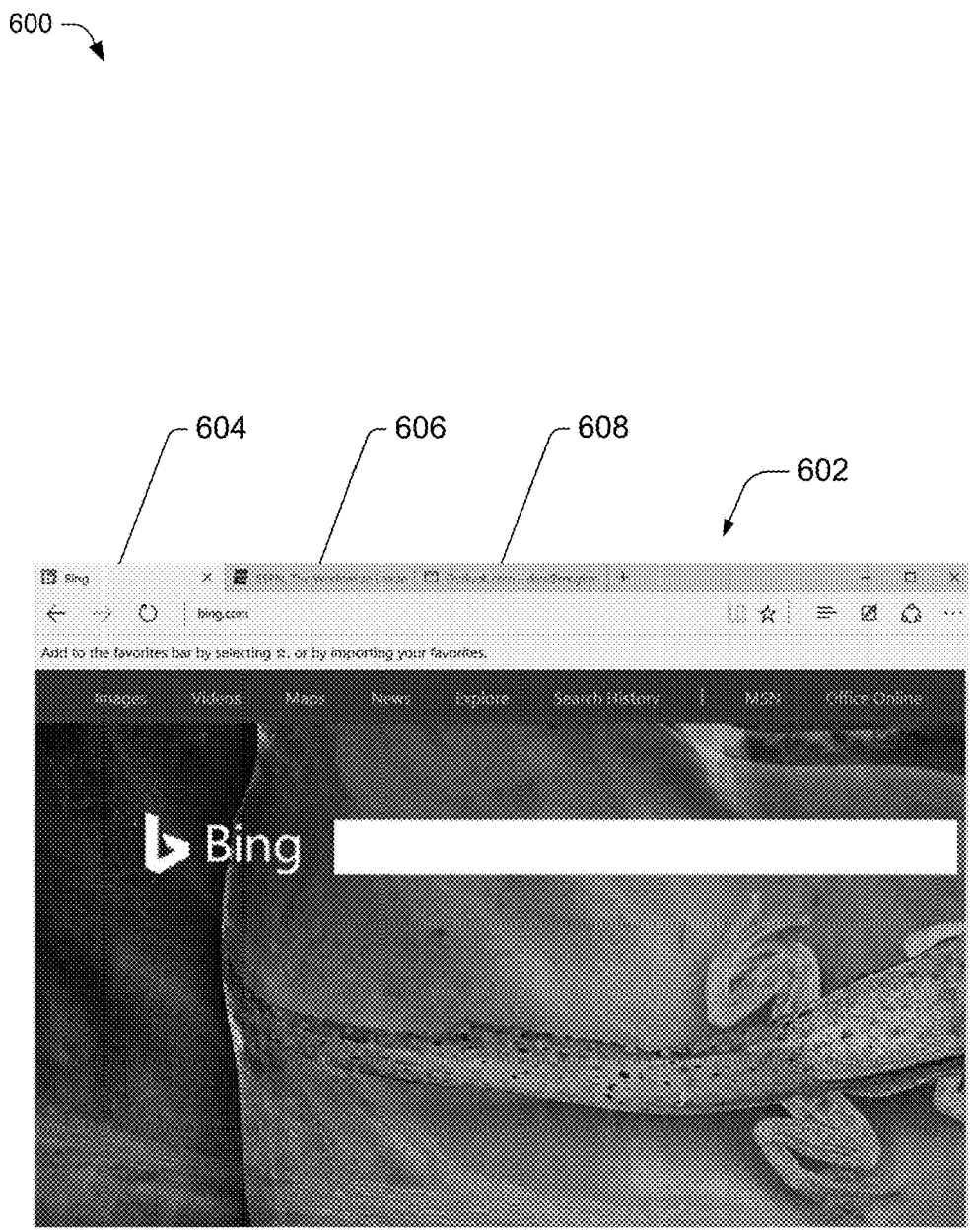
FIG. 6 illustrates an example tabbed UI for a browser in accordance with one or more implementations.

FIG. 6 illustrates an example tabbed UI 602 for a browser in accordance with one or more implementations. In this example, the tabbed UI 602 for a browser includes tabs 604, 606, and 608 that are directed to different web pages and resources. Techniques described herein may be applied to the example tabbed UI 602 and comparable tabbed UIs for the browser and for other applications.

Figure 7:
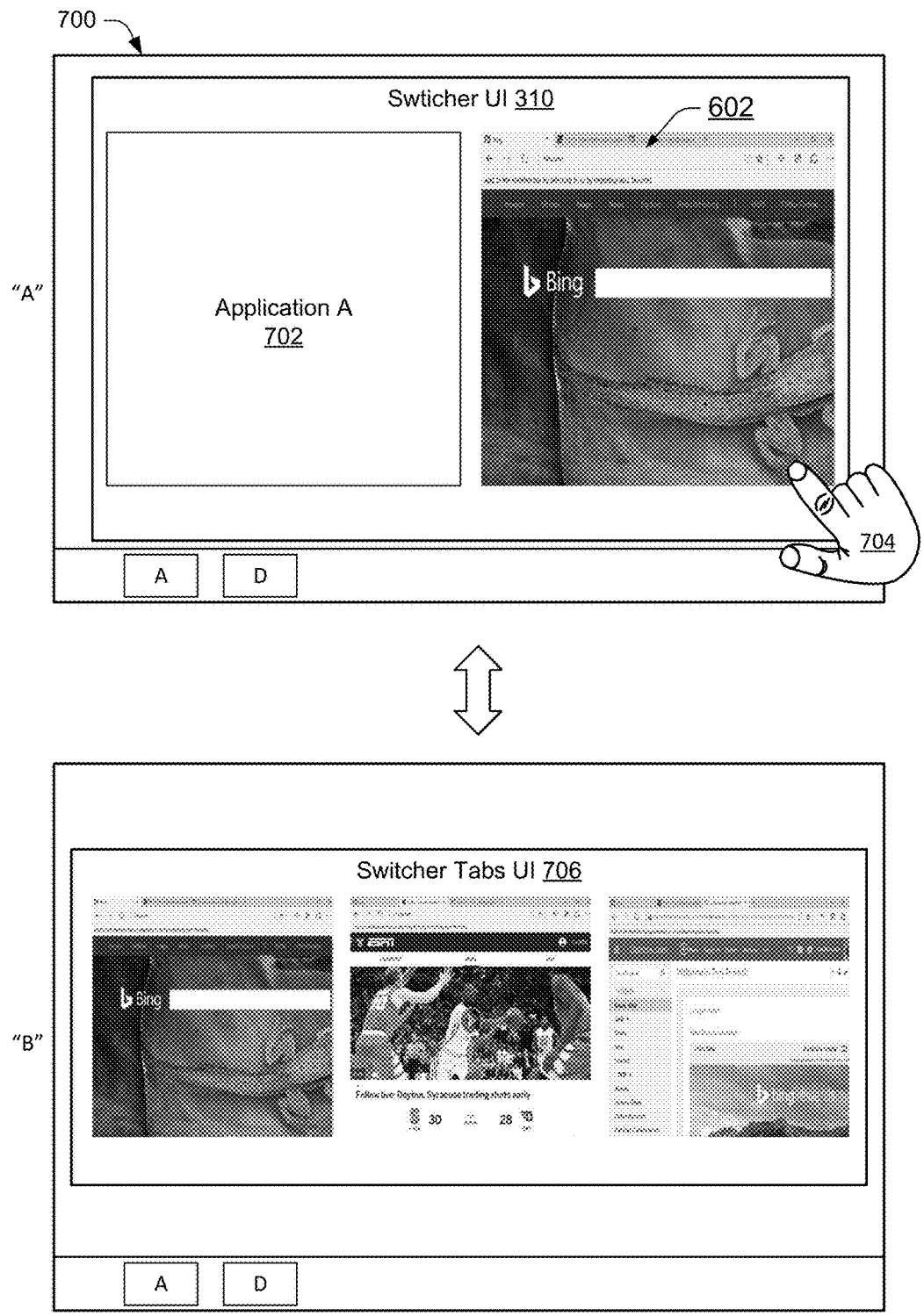
FIG. 7 illustrates an additional example scenario for switching to tabs using multiple level in a switcher in accordance with one or more implementations.

FIG. 7 illustrates an additional example scenario for switching to tabs using multiple levels in a switcher in accordance with one or more implementations. Here, view "A" represents switcher UI 310 as being presented with representations of Application A 702 and the tabbed UI 602 described in relation to FIG. 6. In this example, the tabbed UI 602 is associated with Application D. Instead of showing tabs individually along with other items at the application level, items at the tab level are accessible via interaction with corresponding representations of items at the application level. For example, input 704 to interact with the representation of the tabbed UI 602 may expose a separate UI element designed to present corresponding representations of the tabs included in the tabbed UI 602. Here, a switcher tabs UI 706 is launched responsive to the input 704. The switcher tabs UI 706 include representations of the different tabs contained in the tabbed UI 602. The input 704 in this case may correspond to hovering or dwelling over the tabbed UI 602 representation to launch the separate UI element (here the switcher tabs UI 706). Input 704 may also be in other forms such as clicking on the desired item having tabs, using a keystroke or key combination, selecting an icon exposed with representations for which underlying tabs are available, and so forth. Other kinds of UI visualizations for items at the tab level are also contemplated such as pop-out, overlays, slide-out, separate windows, different panes, a grid layout with level selectors, and so forth. Additional details regarding these and other aspects are discussed in relation to the following example procedure.

Example Procedure

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. By way of example, aspects of the procedures may be performed by a suitably configured computing device, such as by a computing device 102 as in FIG. 1 that includes or makes use of an operating system 116, multi-application environment 118, application manager 128, switchers 130 and/or other components.

Functionality, features, and concepts described in relation to the examples of FIGS. 1-7 may be employed in the context of the procedures described herein. Further, functionality, features, and concepts described in relation to different procedures below may be interchanged among the different procedures and are not limited to implementation in the context of an individual procedure. Moreover, blocks associated with different representative procedures corresponding figures herein may be applied together and/or combined in different ways. Therefore, it is to be appreciated that individual functionality, features, and concepts described in relation to different example environments, devices, components, figures, and procedures throughout this document may be used in any suitable combinations and are not limited to the particular combinations represented by the enumerated examples.

Figure 8:
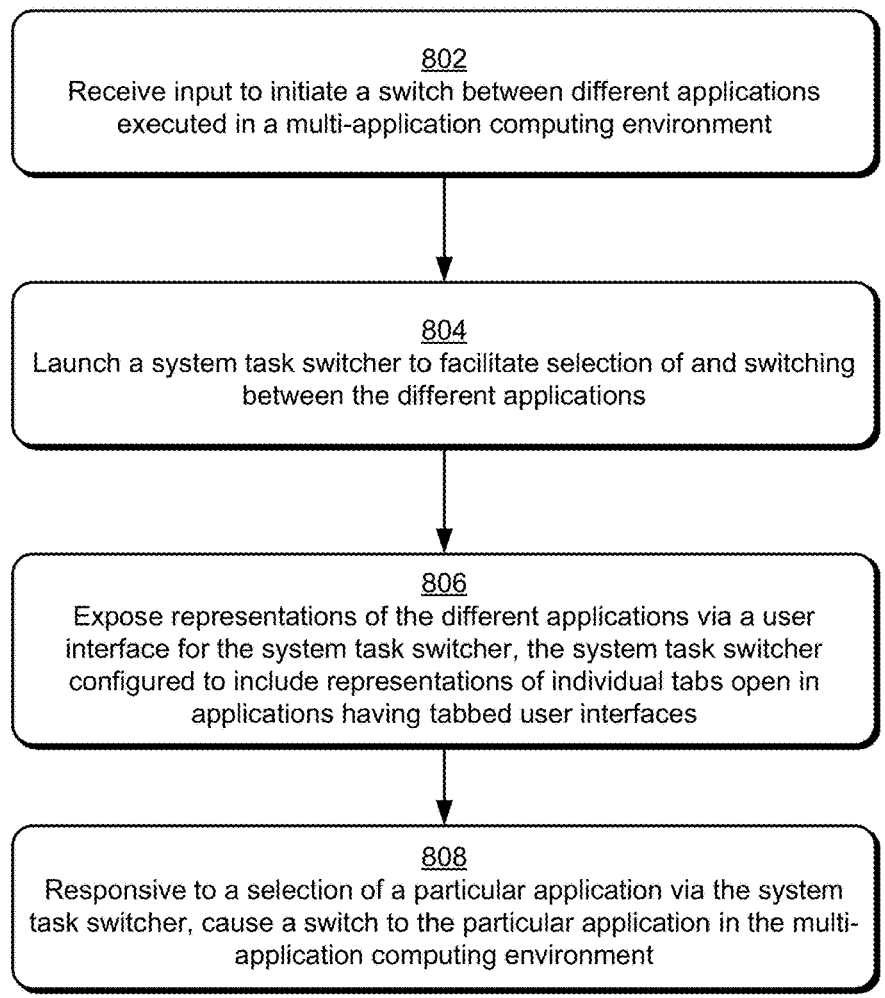
FIG. 8 is a flow diagram depicting an example procedure in accordance with one or more implementations.

FIG. 8 is a flow diagram depicting an example procedure 800 in accordance with one or more implementations. Input is received to initiate a switch between different applications executed in a multi-application computing environment (block 802). Various input modalities may be employed to access a switcher 130 as noted previously. This may include but is not limited to using a key command, clicking a switcher icon or button, using voice commands and so forth. Then, a system task switcher is launched to facilitate selection of and switching between the different applications (block 804). Representations of the different applications are exposed via a user interface for the system task switcher, the system task switcher configured to include representations of individual tabs open in applications having tabbed user interfaces (block 806). Various different switchers 130 and visualizations for switching are contemplated, examples of which were described previously. Tabs may be included in the visualizations along with application representations or using separate UI elements. In some cases, the switcher implements an application level and a tab level accessible via interaction with items at the application level that have underlying tabs. Here, a hierarchy of menus/views to access items for switching is established and may be utilized for task switching. Responsive to a selection of a particular application via the system task switcher, a switch is caused to the particular application in the multi-application computing environment (block 808). In particular, the switcher 130 causes a selected application to move to a top position in the window stack and/or application queue. Additionally, focus is directed to the selected application. If the selected item is a tab, the corresponding application window is shown with the selected tab at the forefront of the arrangement of tabs.

Having considered some example details, consider now a discussion of an example system and devices that may be employed in one or more implementations.

Example System and Device

Figure 9:
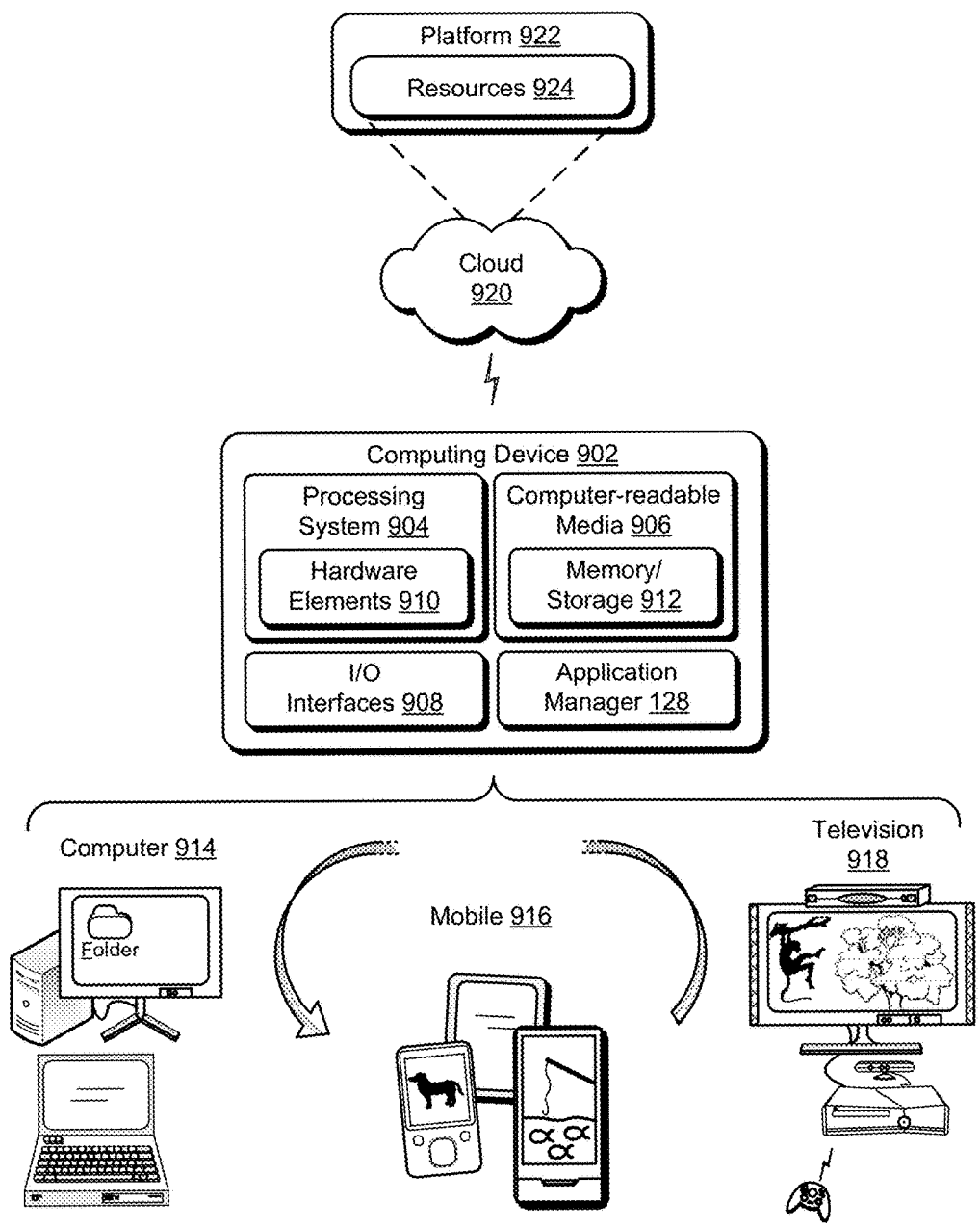
FIG. 9 illustrates an example system having devices and components that may be employed to implement aspects of the techniques described herein.

FIG. 9 illustrates an example system generally at 900 that includes an example computing device 902 that is representative of one or more computing systems and/or devices that may implement the various techniques described herein. The computing device 902 may be, for example, a server of a service provider, a device associated with the client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 902, such as via a network. Communication media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including operating system 116, multi-application environment module 118, applications 124, application manager 128, switchers 130 and other program modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of modules as a module that is executable by the computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 902 may assume a variety of different configurations, such as for computer 914, mobile 916, and television 918 uses. Each of these configurations includes devices that may have generally different constructs and capabilities, and thus the computing device 902 may be configured according to one or more of the different device classes. For instance, the computing device 902 may be implemented as the computer 914 class of a device that includes a personal computer, desktop computer, a multi-screen computer, laptop computer, netbook, and so on.

The computing device 902 may also be implemented as the mobile 916 class of device that includes mobile devices, such as a mobile phone, portable music player, portable gaming device, a tablet computer, a multi-screen computer, and so on. The computing device 902 may also be implemented as the television 918 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. This is illustrated through inclusion of the application manager 128 on the computing device 902. The functionality of the application manager 128 and other modules may also be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the computing device 902. Resources 924 can also include services provided over the Internet and/or through a subscriber network, such as a cellular or Wi-Fi network.

The platform 922 may abstract resources and functions to connect the computing device 902 with other computing devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the computing device 902 as well as via the platform 922 that abstracts the functionality of the cloud 920.

EXAMPLE IMPLEMENTATIONS

Example implementations of techniques described herein include, but are not limited to, one or any combinations of one or more of the following examples:

Example 1

A computer-implemented method comprising: receiving input to initiate a switch between different applications executed in a multi-application computing environment; launching a system task switcher to facilitate selection of and switching between the different applications; exposing representations of the different applications via a user interface for the system task switcher, the system task switcher configured to include representations of individual tabs open in applications having tabbed user interfaces; and responsive to a selection of a particular application via the system task switcher, causing a switch to the particular application in the multi-application computing environment.

Example 2

The computer-implemented method as described in example 1, wherein the different applications include a browser having a tabbed interface with multiple tabs.

Example 3

The computer-implemented method as described in example 1, wherein the selection of the particular application comprises selecting a particular tab via a corresponding representation and the switch to the particular application includes switching the particular application to display the particular tab.

Example 4

The computer-implemented method as described in example 1, wherein representations of individual tabs are rendered together with representations of the different applications.

Example 5

The computer-implemented method as described in example 1, wherein representations of individual tabs are exposed via a separate UI element that is accessible through interaction with the representations of the different applications.

Example 6

The computer-implemented method as described in example 5, wherein the separate UI element is accessible responsive to hovering or dwelling over an application representation having underlying tabs accessible via the system task switcher.

Example 7

The computer-implemented method as described in example 1, wherein the exposing representations of the different applications comprises showing a thumbnail for each available application and tab.

Example 8

The computer-implemented method as described in example 7, wherein the thumbnails are presented in a grid, a row, or a column.

Example 9

The computer-implemented method as described in example 1, wherein the exposing representations of the different applications comprises visualizing the application windows as a stack of items with tabs included and enabling a user to cycle through the stack to select different items.

Example 10

The computer-implemented method as described in example 1, wherein the system task switcher implements an application level and a tab level accessible via interaction with items exposed at the application level that have underlying tabs.

Example 11

A system comprising: a processing system; one or more computer-readable media storing processor-executable instructions that, responsive to execution by the processing system, perform operations comprising: receiving input to initiate a switch between different applications executed in a multi-application computing environment; launching a system task switcher to facilitate selection of and switching between the different applications; exposing representations of the different applications via a user interface for the system task switcher, the system task switcher configured to include representations of individual tabs open in applications having tabbed user interfaces; and responsive to a selection of a particular application via the system task switcher, cause a switch to the particular application in the multi-application computing environment.

Example 12

The system as described in example 11, wherein the different applications include a browser having a tabbed interface with multiple tabs.

Example 13

The system as described in example 11, wherein the selection of the particular application comprises selecting a particular tab via a corresponding representation and the switch to the particular application includes switching the particular application to display the particular tab.

Example 14

The system as described in example 11, wherein representations of individual tabs are rendered together with representations of the different applications.

Example 15

The system as described in example 11, wherein representations of individual tabs are exposed via a separate UI element that is accessible through interaction with the representations of the different applications.

Example 16

The system as described in example 15, wherein the separate UI element is accessible responsive to hovering or dwelling over an application representation having underlying tabs accessible via the system task switcher.

Example 17

The system as described in example 11, wherein the exposing representations of the different applications comprises showing a thumbnail for each available application and tab.

Example 18

The system as described in example 11, wherein the exposing representations of the different applications comprises visualizing the application windows as a stack of items with tabs included and enabling a user to cycle through the stack to select different items.

Example 19

The system as described in example 11, wherein the system task switcher implements an application level and a tab level accessible via interaction with items exposed at the application level that have underlying tabs.

Example 20

One or more computer-readable storage media storing processor-executable instructions that, responsive to execution by a processing system of a computing device, implement a system task switcher to perform operations comprising: receiving input to initiate a switch between different applications executed in a multi-application computing environment; launching the system task switcher to facilitate selection of and switching between the different applications; exposing representations of the different applications via a user interface for the system task switcher, the system task switcher configured to include representations of individual tabs open in applications having tabbed user interfaces; and responsive to a selection of a particular application via the system task switcher, cause a switch to the particular application in the multi-application computing environment.

CONCLUSION

Although embodiments of techniques and apparatuses enabling adaptive sizing and positioning of application windows have been described in language specific to features and/or methods, it is to be understood that the subject of the appended claims is not necessarily limited to the specific features or methods described. Rather, the specific features and methods are disclosed as example implementations enabling adaptive sizing and positioning of application windows.

What is claimed is:

1. A computer-implemented method comprising:
receiving first input to initiate a switch between different applications that are being executed in a multi-application computing environment, wherein:
  the different applications include a first application and a second application, and
  the second application is executing first content in association with a first tab and second content in association with a second tab, the first tab in a top-level of a tabbed user interface (UI) of the second application and the second tab in a lower-level of the tabbed UI of the second application;
responsive to the first input, causing display of individual representations of the different applications via a switcher user interface (UI) for a system task switcher, wherein the switcher (UI) includes:
  a first representation of the first application, and
  a second representation of the first tab being displayed in the top-level of the tabbed UI; and
receiving a second input in association with the second representation;

responsive to the second input, causing display of a third representation of the second tab being displayed in the top-level of the tabbed UI; and responsive to a selection of the third representation via the system task switcher, switching the top-level of the tabbed UI from the first tab to the second tab.

2. The computer-implemented method as described in claim 1, wherein the second application is a web browser application.

3. The computer-implemented method as described in claim 1, wherein representations of individual tabs are rendered together with representations of the different applications.

4. The computer-implemented method as described in claim 1, wherein the second input corresponds to hovering over the second representation.

5. The computer-implemented method as described in claim 1, wherein the causing display of the individual representations of the different applications comprises showing an individual thumbnail for each tab of multiple tabs that are being displayed within the tabbed UI of the second application.

6. The computer-implemented method as described in claim 5, wherein multiple individual thumbnails for the multiple tabs are presented in a grid, a row, or a column.

7. The computer-implemented method as described in claim 1, wherein the individual representations of the different applications are displayed as a stack of items with tabs included, and wherein the system task switcher enables a user to cycle through the stack of items to select different items.

8. The computer-implemented method as described in claim 1, wherein the system task switcher implements the switcher UI to include:
an application level switcher UI, and
a tab level switcher UI that is accessible via interaction with items that are displayed via the application level switcher UI and that have underlying tabs that are displayed in an inactive state.

9. A system comprising:
a processing system;
one or more computer-readable media storing processor-executable instructions that, responsive to execution by the processing system, perform operations comprising:
receiving a first input to initiate a switch between at least a first application and a second application that are being executed in a multi-application computing environment, wherein the second application is executing first content in association with a first tab and second content in association with a second tab, and wherein the first tab is associated with a top-level of a tabbed user interface (UI) of the second application;
responsive to the first input, causing display of an application level user interface (UI) of a system task switcher, wherein the application level UI includes:
a first representation of the first application, and
a second representation showing the first tab of the second application in association with the top-level of the tabbed UI;
receiving a second input in association with the second representation;
responsive to the second input, causing display of a tab level UI of the system task switcher, wherein the tab level UI includes individual representations for individual tabs that are open in the second application, the individual representations including at least a third representation showing the second tab in association with the top-level of the tabbed UI; and
responsive to a selection of the third representation of the second tab, via the tab level UI, switching the second tab to the top-level of the second application in the multi-application computing environment.

10. The system as described in claim 9, wherein the individual representations of the individual tabs are rendered together with representations of different applications.

11. The system as described in claim 9, wherein at least some of the individual representations of the individual tabs are omitted from the application level UI, and wherein the at least some of the individual representations of the individual tabs are exposed via the tab level UI in response to a user interaction with the application level UI.

12. The system as described in claim 11, wherein the user interaction with the application level UI includes hovering over the second representation of the second application.

13. The system as described in claim 9, wherein the application level UI includes individual thumbnails for individual applications that are being executed in the multi-application computing environment, and wherein the application level UI includes a single thumbnail for the second application that is executing the first tab and the second tab.

14. The system as described in claim 9, wherein the system task switcher is configured to:
cause display of a plurality of application windows as a stack of items with tabs included, and
enable a user to cycle through the stack to select different items.

15. One or more computer-readable storage media storing processor-executable instructions that, responsive to execution by a processing system of a computing device, implement multiple levels of a system task switcher to perform operations comprising:
receiving a first input to initiate a switch between a first number of different applications that are being executed in a multi-application computing environment, wherein a particular application, of the different applications, is executing content that is distributed across a second number of tabs in a tabbed user interface (UI);
responsive to the first input, causing display of an application level user interface (UI) for the system task switcher, the application level UI including application representations that correspond to the first number of different applications;
receiving, via the application level UI, a second input in association with a particular application representation that corresponds to the particular application;
responsive to the second input via the application level UI, causing display of a tab level user interface (UI) for the system task switcher, the tab level UI including tab representations that correspond to the second number of tabs, wherein the first number, that corresponds to the different applications that are being executed in the multi-application computing environment, is different than the second number that corresponds to the tabs that the content being executed by the particular application is distributed across; and
responsive to a selection of a particular tab representation for a particular tab, switching the particular tab to a top-level of the tabbed UI.

16. The system as described in claim 15, wherein the first tab is displayed in the second representation in association with a lower-level of the tabbed UI, and wherein the second tab is displayed in the third representation in association with the lower-level of the tabbed UI.

17. The one or more computer-readable storage media of claim 15, wherein at least one tab that is associated with a top-level of the tabbed UI when the first input is received is displayed in a lower-level of the tabbed UI in at least one tab representation of the tab level UI.

* * * * *